United States Patent [19]
Sallberg et al.

[11] 3,974,364
[45] Aug. 10, 1976

[54] STRUCTURE FOR AND METHOD OF ERROR COMPENSATION

[75] Inventors: David W. Sallberg, Farmington Hills; Walter E. Meyer, Royal Oak, both of Mich.

[73] Assignee: Koehring Company, Milwaukee, Wis.

[22] Filed: Feb. 28, 1975

[21] Appl. No.: 554,314

[52] U.S. Cl. .............................. 235/151.31; 73/67.3; 235/150.1
[51] Int. Cl.² ..................... G01M 7/00; G01R 19/04
[58] Field of Search ................... 73/71.4, 71.6, 67.3, 73/67.4; 235/151.3, 151.31

[56] References Cited
UNITED STATES PATENTS

| | | | |
|---|---|---|---|
| 3,462,999 | 8/1969 | Fultz et al. | 73/71.6 |
| 3,848,115 | 11/1974 | Sloane et al. | 73/71.6 |

*Primary Examiner*—Eugene G. Botz
*Attorney, Agent, or Firm*—Whittemore, Hulbert & Belknap

[57] ABSTRACT

Structure for and method of compensating for a mechanical frequency response structure induced phase shift of an alternating electrical command signal in a closed loop control circuit so that magnitude errors independent of phase errors may be utilized in the control circuit. The structure includes a mechanical structure to be controlled having a mechanical frequency response to the cyclic command signal, an electronic frequency response circuit for producing a phase shift in the command signal substantially the same as that produced by the mechanical frequency response structure over the frequency range of the command signal, and structure for summing the error signal from the mechanical frequency response structure and from the electronic frequency response circuit to provide a magnitude error only signal, and means for providing an output signal when the selected error signal is outside of a permissible error signal range. The structure may also include switch means so that a combined magnitude and phase error signal may be substituted for the magnitude only error signal to again provide an output signal when the combined error signal is outside of a permissible error signal range.

13 Claims, 2 Drawing Figures

STRUCTURE FOR AND METHOD OF ERROR COMPENSATION

BACKGROUND OF THE INVENTION

1. Field of the Invention

The invention relates to closed loop control circuits or the like and refers more specifically to a closed loop control circuit and structure for and the steps of operating on a feedback signal from a controlled mechanical frequency response structure to provide an error signal, and for providing an output signal when the error signal is not between a lower and an upper signal limit.

2. Description of the Prior Art

In closed loop control circuits it is often desirable to monitor the error signal, i.e., the difference between the command and feedback signals, in order to assure that the output, which is equivalent to the feedback signal, is properly corresponding to the command signal. If this error exceeds a predetermined permissible error, then a detection circuit is actuated which provides appropriate indication or action such as stopping the system.

For many applications where cyclic input is used, such as fatigue test systems, it is desired to maintain output magnitude equal to input magnitude, but phase errors are permissible. In the past, error detection circuits have been subject to error introduced by the phase shift of the controlled structure in addition to any magnitude errors. In many instances, the phase error far exceeds the desired permissible band of magnitude error, causing the conventional direct comparison circuit to be of little value for monitoring system magnitude error.

SUMMARY OF THE INVENTION

In accordance with the invention there is disclosed structure for providing a magnitude error only signal in a closed loop control circuit having a cyclic input command signal and for providing an output signal when the error signal is less than a lower limit or greater than an upper limit.

The structure for providing a magnitude error only signal includes an electronic frequency response circuit having an electronic frequency response to input command frequencies similar to that of the mechanical frequency response structure controlled so that the magnitude error only signal is produced by summing a feedback signal including magnitude and phase error with a command signal altered electronically to have the same phase error as the feedback signal from the mechanical frequency response structure.

An optional selector may be provided so that either the magnitude only error signal, or the conventional magnitude plus phase error signal is applied to the error detector circuit.

DESCRIPTION OF THE PREFERRED EMBODIMENT

Figure 1:
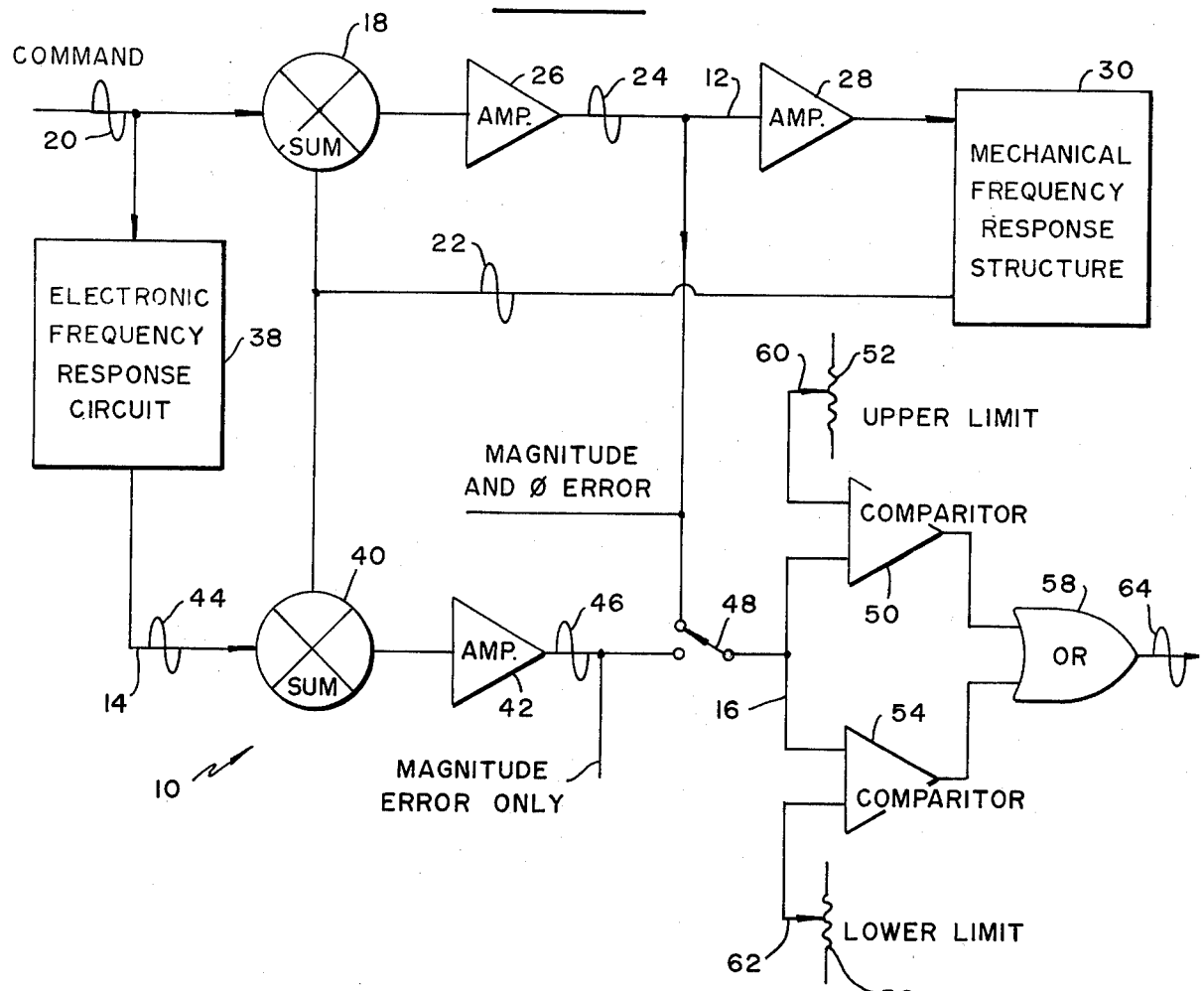
FIG. 1 is a partially schematic, partially block diagram of structure for performing the steps of error compensation in accordance with the invention.

As shown best in FIG. 1, the electronic circuit 10 includes the closed loop control circuit 12, the phase error compensating circuit 14 and the error detector circuit 16.

The control circuit 12 includes a summing device 18 for summing an alternating electrical command signal 20 and a feedback signal 22 to provide a magnitude and phase error signal 24 which is amplified through error amplifier 26 and fed through driver amplifier 28 to a mechanical frequency response structure 30 which produces the feedback signal.

The summing structure 18, the amplifiers 26 and 28 and the mechanical frequency response structure 30, together with their connections provide a known closed loop control circuit which can be made responsive to the command signal 20 to provide a desired result from the mechanical frequency response structure 30 such as, for example, in test equipment required to have controlled movement.

In practice, most mechanical frequency response structures have a variable response in accordance with the frequency of a command signal fed thereto. Thus, the error signal 24 becomes a function of the frequency response of the mechanical frequency response structure including error due to phase difference between the command signal 20 and the feedback signal 22 in addition to any magnitude error between these signals.

Figure 2:
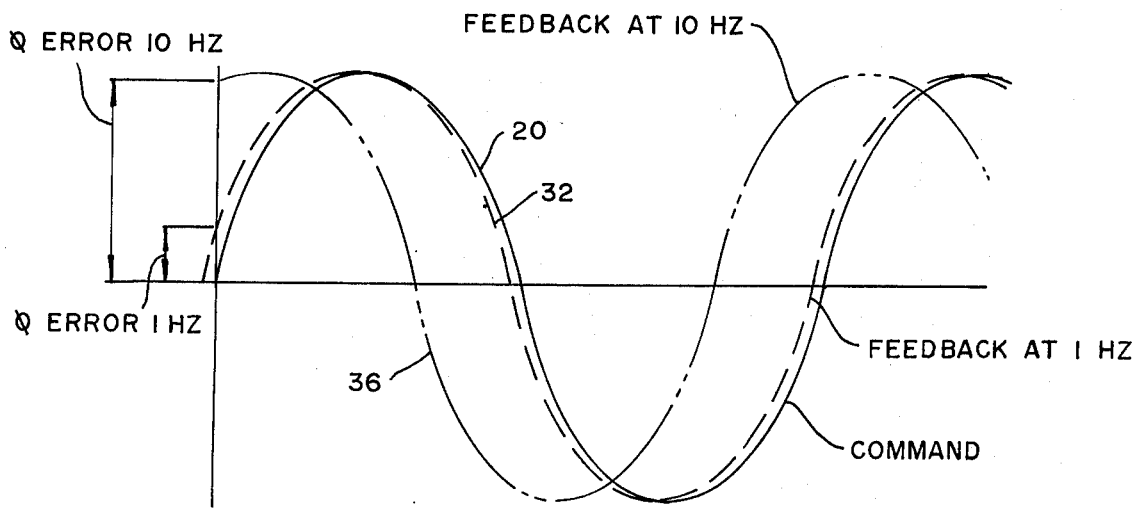
FIG. 2 is a diagram useful in explaining the problem which the structure of FIG. 1 and the error compensation method performed therewith solves.

In particular, referring to FIG. 2, for example, the command signal 20 may be, as shown in full line, and the feedback signal 22 at, for example, 1HZ, may be as shown in FIG. 2 as dotted line 32. The difference in the phase of the signals represented by lines 20 and 32, as shown in FIG. 2, is due to the phase shift created in the mechanical frequency response structure 30.

If there is no magnitude error (magnitude being defined as the upper and lower peak values achieved during cyclic operation) between the command signal and the feedback signal at 1HZ as shown in FIG. 2, the phase error which will show up as a voltage component in the magnitude and phase error signal 24 in FIG. 1 will be the phase error 1HZ illustrated in FIG. 2.

If, then, the command signal is changed to 10HZ from the 1HZ signal, the mechanical frequency response structure 30 may produce a phase shift as shown by the dash line 36 in FIG. 2 so that the component of the error signal 24 due to the phase error will be as shown in FIG. 2 the phase error 10HZ.

Obviously the phase error component in the magnitude and phase error signal 24 may thus be substantial. Further, it is a function of the frequency response of the particular mechanical structure 30 being controlled by the circuit 12 to the frequency of the command signal 20.

The phase error compensating circuit 14, in accordance with the invention as shown in FIG. 1, includes an electronic frequency response circuit 38, a summing circuit 40 and an amplifier 42.

The electronic frequency response circuit 38 is a circuit constructed to have the same frequency response over the command signal frequency range that the mechanical frequency response structure 30 has. Such electronic frequency response circuits are within the skill of the art to produce and would vary with each mechanical frequency response structure. Thus, no specific electronic frequency response circuit is disclosed herein.

The summing circuit 40 is provided to sum the feedback signal 22 having a phase error component therein with the signal 44 from the electronic frequency response circuit 38, which is the command signal 20, having a phase error which is the same as the phase error in the signal 22. The summing of these two signals in the summing circuit 40 thus produces an error signal 46 which is amplified through amplifier 42 which has only a magnitude error since the phase error has been compensated for.

Optional switching structure 48 is provided so that either a magnitude and phase error signal 24 or a magnitude error signal only 46 may be selectively coupled to the error detector circuit 16. As shown, the switch 48 may be a single pole, double throw switch.

The output circuit 16 includes an upper limit comparator 50, an upper limit reference voltage source 52, a lower limit comparator 54, a lower limit reference voltage source 56 and an output OR gate 58. Thus, with a particular upper limit reference voltage set with the potentiometer arm 60 and a lower limit reference voltage set by the lower potentiometer arm 62, an output signal 64 will be provided through the OR gate 58 if the input signal from the switch 48 is greater than the upper limit reference voltage or lower than the lower limit reference voltage.

In overall operation of the structure for error compensation 10 and in practicing the method of the invention, when in a closed loop control circuit 12 it is desirable to have magnitude and phase error combined, the switch 48 is as shown in FIG. 1 placed in an upper position and the command signal 20 is fed through the amplifier 26 and amplifier 28 to produce a controlled result from the mechanical frequency response structure 30 and a feedback signal 22, which as previously indicated, includes both magnitude and phase error components. The magnitude and phase error signal is taken from between the amplifier 26 and amplifier 28 and fed to the error detector circuit 16 through switch 48 to provide an output signal 64 when the total magnitude and phase error is below a lower limit or above an upper limit.

When only the magnitude error is desired, the switch 48 is placed in the lower position as shown in FIG. 1, the command signal is fed through the mechanical frequency response structure 30 to provide a feedback signal 22 having both magnitude and phase error components. The feedback signal is summed in the summing circuit 40 with the command signal having a similar phase error component; that is, signal 44, to provide a magnitude error only signal 46 which is again fed to the error detector circuit 16 through the switch 48 to again provide an output signal 64 when the magnitude error only signal is not between the lower and upper limits set by the potentiometer arms 60 and 62.

While one embodiment of the present invention has been considered in detail, it will be understood that other embodiments and modifications thereof are contemplated by the inventor. It is therefore the intention to include all such embodiments and modifications thereof as are defined by the appended claims within the scope of the invention.

What I claim as my invention is:

1. Error compensation structure comprising a closed loop control circuit including means for receiving a command signal, first summing means for summing the command signal and a feedback signal including both magnitude and phase error components, and mechanical frequency response structure connected to receive the command signal as an input thereto and having the feedback signal as an output therefrom in a closed loop, an electronic frequency response circuit having substantially the same frequency response as the mechanical frequency response structure connected to receive the command signal, and second summing means for summing the output of the electronic frequency response circuit and the feedback signal to provide a phase compensated error signal which has only a magnitude component.

2. Structure as set forth in claim 1 and further including means operably connected to the closed loop control circuit and the second summing circuit for also selectively providing an error signal which has magnitude and phase error components combined.

3. Structure as set forth in claim 2 wherein the means for selectively providing the error signal comprises a single pole, double throw switch including two terminals and one pole, which switch is connected at one terminal through an amplifier to the first summing means and connected at the other terminal through an amplifier to the second summing means.

4. Structure as set forth in claim 2 and further including means for providing an output signal when the selected error signal is not within a predetermined range.

5. Structure as set forth in claim 4 wherein the means for providing an output signal includes a comparator, an upper limit reference voltage connected to one side of the comparator and means connecting the other side of the comparator to the means for providing the error signal and an OR gate connected to the comparator for providing an output on receipt of an output from the comparator.

6. Structure as set forth in claim 4 wherein the means for providing an output signal includes a comparator, a lower limit reference signal connected to one side of the comparator and means connecting the other side of the comparator to the means for providing the error signal and an OR gate connected to the comparator for providing an output on receipt of an output from the comparator.

7. Structure for error compensation comprising a first summing means, means for passing an alternating electrical command signal into the summing means, a mechanical frequency response structure, a first error amplifier and a driver amplifier connected in series between the first summing means and the mechanical frequency response structure, means for feeding back a signal from the mechanical frequency response structure to the first summing means for summing with the command signal to provide an error signal output from the summing structure through the amplifier circuits to the mechanical frequency response structure having both magnitude and phase error components, an electronic frequency response circuit connected to receive the command signal and to provide an output signal which has a phase error over the frequency range of the command signal input substantially the same as that of the mechanical frequency response structure, second summing means connected to receive the output signal from the electronic frequency response circuit and the feedback signal from the mechanical frequency response structure, a second error amplifier connected to receive the output of the second summing means and providing a magnitude error only output signal.

8. Structure as set forth in claim 7 and further including a single pole, double throw switch, having two terminals and one pole, one of which terminals is connected between the first error amplifier and driver amplifier to receive a combined magnitude and phase error signal and the second of which terminals is connected to the second error amplifier to receive a magnitude error only signal whereby the output signal from the pole of said switch may selectively be a combined magnitude and phase error signal or a magnitude error only signal.

9. Structure as set forth in claim 8 and further including an error detecting circuit including an upper limit comparator and a lower limit comparator, a lower limit reference voltage source and an upper limit reference voltage source, means connecting the lower limit reference voltage source to one side of the lower limit comparator and means connecting the upper limit reference voltage source to one side of the upper limit comparator, means for connecting the pole of the switch to the other sides of the lower limit and upper limit comparators, and an OR gate connected to the output of the comparators for producing an output signal when there is an output from either comparator.

10. The method of error compensation in a closed loop control circuit in which cyclic electrical command signals are utilized to provide a control function for a mechanical frequency response structure driven by the command signal and producing a feedback signal having both magnitude and phase error components, comprising providing a modified command signal having substantially the same phase error over the range of command signal frequencies as the mechanical frequency response structure and summing a feedback signal from the mechanical frequency response structure and the modified command signal to provide a magnitude error only signal.

11. The method as set forth in claim 10 and further including providing an output signal in response to the error signal when the error signal is not between a selected lower and upper limit.

12. The method as set forth in claim 10 and further including selectively providing both the magnitude error only signal and a combined magnitude and phase error signal.

13. The method as set forth in claim 12 and further including providing an output signal in response to the error signal when the error signal is not between a selected lower and upper limit.

* * * * *